(12) United States Patent
So et al.

(10) Patent No.: US 6,787,960 B2
(45) Date of Patent: Sep. 7, 2004

(54) AC INDUCTION MOTOR AND METHOD OF STARTING SAME

(75) Inventors: Eric So, Fareham (GB); Steven Christopher Birch, Southsea (GB); Guy John Middleton, Homdean (GB)

(73) Assignee: Eaton Corporation, Cleveland, OH (US)

( * ) Notice: Subject to any disclaimer, the term of this patent is extended or adjusted under 35 U.S.C. 154(b) by 35 days.

(21) Appl. No.: 10/164,109

(22) Filed: Jun. 5, 2002

(65) Prior Publication Data

US 2002/0195987 A1 Dec. 26, 2002

(30) Foreign Application Priority Data

Jun. 15, 2001 (GB) ............................................. 0114665

(51) Int. Cl.⁷ ............................... H02K 3/28; H02P 1/26
(52) U.S. Cl. ........................ 310/184; 318/778; 318/785
(58) Field of Search ................................. 310/180, 184, 310/89; 318/778, 785, 786

(56) References Cited

U.S. PATENT DOCUMENTS

| | | | |
|---|---|---|---|
| 4,443,749 A | | 4/1984 | Douthart et al. ............ 318/774 |
| 4,446,416 A | * | 5/1984 | Wanlass ..................... 318/812 |
| 4,520,287 A | * | 5/1985 | Wang et al. ................. 310/184 |
| 4,890,049 A | | 12/1989 | Auinger ...................... 318/771 |
| 5,075,585 A | * | 12/1991 | Teruyama et al. ............ 310/89 |
| 5,227,710 A | * | 7/1993 | Lewus ......................... 318/781 |
| 5,883,488 A | * | 3/1999 | Woodward ................... 318/786 |
| 5,969,497 A | | 10/1999 | McDonald et al. .......... 318/778 |

FOREIGN PATENT DOCUMENTS

| | | | |
|---|---|---|---|
| EP | 0421655 | 9/1990 | ......... H02K/16/00 |
| EP | 0499989 | 2/1992 | ............. H02P/1/26 |
| GB | 1014365 | 5/1963 | ......... H02K/17/02 |
| GB | 2321560 | 7/1998 | ......... H02K/3/28 |
| JP | 55023726 | 8/1978 | ......... H02K/17/14 |
| JP | 62239849 | 10/1987 | ......... H02K/17/08 |
| WO | WO9949563 | 9/1999 | ............. H02P/3/18 |

* cited by examiner

Primary Examiner—Burton Mullins
(74) Attorney, Agent, or Firm—Tarolli, Sundheim, Covell & Tummino L.L.P.

(57) ABSTRACT

An AC induction motor has separate start and run windings radially separated in slots in the stator laminations. The start windings are arranged in the radially outer portions of the slots to aid heat dissipation and to increase the flux linkage so as to reduce inrush current during starting. The motor is started by switching on the start windings initially, and switching on the run windings in phase with the start windings when the motor reaches its running speed, but before switching off the start windings. In this way, the surge current during switching between the start and run windings is reduced.

10 Claims, 8 Drawing Sheets

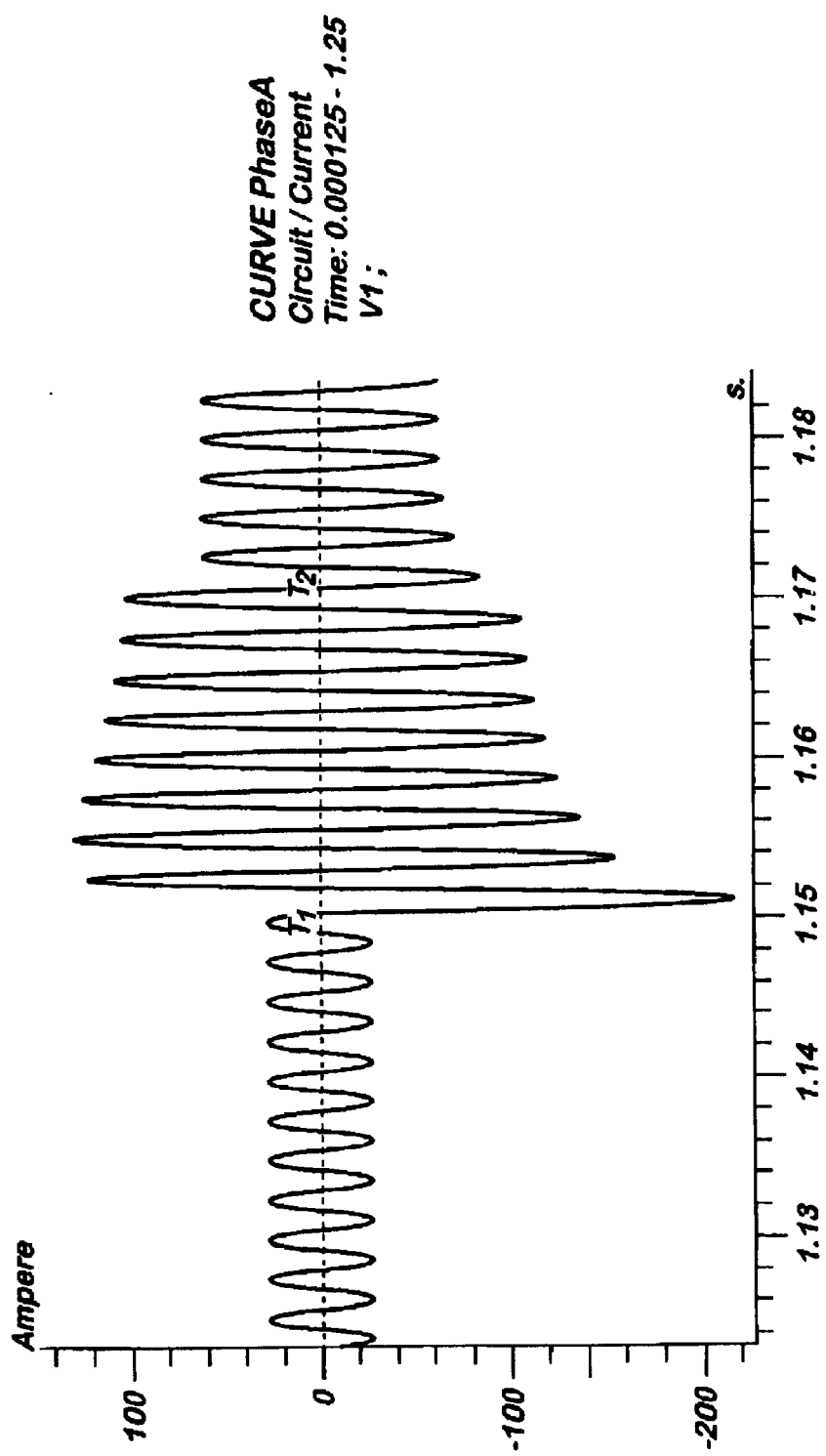

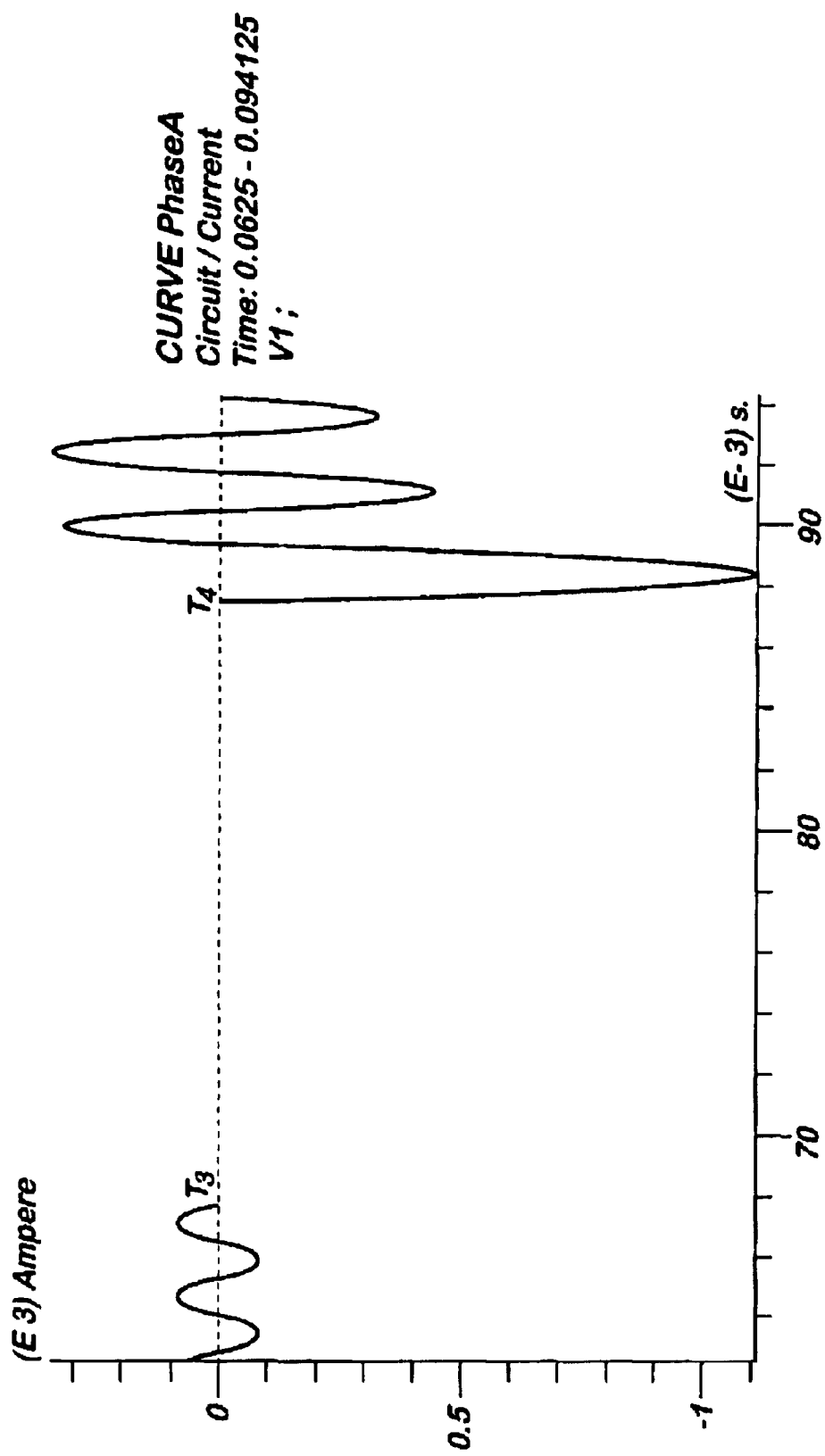

AC INDUCTION MOTOR AND METHOD OF STARTING SAME

FIELD OF THE INVENTION

One aspect of the present invention relates to a stator for an AC induction motor having a plurality of independently switchable windings, and particularly but not exclusively, start and run windings. Another aspect relates to a method of switching the windings of such a motor, particularly but not exclusively when starting the motor.

BACKGROUND OF THE INVENTION

A problem associated with induction motors is the high inrush current which occurs when the motor is started. The inrush current is caused by the high initial slip between the rotating magnetic fields of the stator and the stationary rotor, leading to a low initial back e.m.f. The electrical supply and other components must therefore be specified for the high inrush current, even though this only occurs during starting. Hence, a lower inrush current allows more efficient use of the electrical system. A number of methods of reducing the inrush current have been proposed, all of which suffer from drawbacks.

The inrush current can be reduced to some extent by increasing the electrical resistance of the rotor cage, but this impairs the running performance of the motor.

Reduced voltage starters supply a low voltage to the windings on starting, which voltage is increased as the motor accelerates. One example is the star-delta system, in which the motor winding configuration is switched from an initial star connection to a delta connection. However, the current surge during the connection changeover can be as high as the initial inrush current. This surge is caused by a phase difference between the rotor and stator fluxes, which occurs in conditions of low load inertia or high friction.

Primary resistance starters apply an initial electrical resistance in series with the windings, which is reduced as the motor accelerates. This type of starter suffers from problems of heat generation and excess weight.

Many of the problems of the electromechanical starters described above can be overcome with an electronic power controller, but these are generally more expensive and less reliable than electromechanical starters, and may be unsuitable for harsh environments or safety-critical applications.

The document U.S. Pat. No. 4,443,749 discloses a multiple split-phase induction motor having a two-pole start winding, a two-pole run winding and a four-pole run winding. To start the motor, current is supplied to both the start winding and one of the run windings. Hence, a high inrush current is likely to occur. The start winding is disconnected once the motor reaches a predetermined speed.

The document U.S. Pat. No. 5,969,497 discloses a starting circuit for an induction motor in which a stationary flux is applied to the rotor through one of the phase windings and current is subsequently applied through another of the phase windings to generate a starting torque. There is no separate start winding; instead, the different phases of the stator winding are switched independently.

The document WO 99/49563 discloses a dual stator winding induction machine having two separate stator windings with different numbers of poles. The aim of this design is to eliminate magnetic coupling between the two windings and to overcome circulating harmonic currents.

The document GB 2,321,560 discloses a stator with radially displaced sets of windings having a mutually different phase arrangement.

The document GB 1,014,365 discloses a stator with start windings displaced radially inwardly and offset by 90° from the run windings.

The document EP-A-0 499 989 discloses a method of starting a squirrel cage motor by progressively connecting winding branches to the supply voltage.

STATEMENT OF THE INVENTION

According to one aspect of the present invention, there is provided a stator for an AC induction motor, including a set of start windings and a set of run windings independently switchable from the set of start windings, characterized in that the set of start windings is radially offset from, and has a similar phase arrangement to, the set of run windings.

In one specific aspect, the set of start windings has a higher resistance and preferably a greater number of turns than the set of run windings and is displaced radially outwardly from the set of run windings. The start windings can therefore make good thermal contact with an outer casing through the stator laminations and are able to dissipate heat effectively.

In another specific aspect, the set of run windings is displaced radially from the set of start windings in the same apertures within the laminations of the stator such that the flux linkage of the set of start windings is greater than that of the set of run windings. Hence, the impedance of the set of start windings is substantially higher than that of the set of run windings and reduces inrush current, whereas the low impedance of the set of run windings allows high performance to be achieved.

Preferably, the cross-sectional area of the set of start windings is less than that of the set of run windings.

According to another aspect of the invention, there is provided a method of starting an AC induction motor having a first set of windings and a second set of windings independently switchable from the first set, comprising:

a. initially supplying current to the first set of windings without supplying current to the second set of windings, and b. subsequently supplying current to the second set of windings while continuing to supply current to the first set of windings, characterized by subsequent to step a, ceasing to supply current to the first set of windings while continuing to supply current to the second set of windings.

Preferably, current is supplied to the second set of windings after the motor has reached a substantially constant speed when driven by the first set of windings.

In this way, a high inrush current can be avoided by initially supplying current only to the first set of windings, while a high switchover current can be avoided by maintaining phase between the first and second set of windings and hence between the windings and the rotor.

Where the first and second set of windings are not identical, circulating currents will be induced when they are both switched on. However, the resultant loss of operating efficiency and excess heat dissipation is insignificant if both sets are switched on for only a short overlap period. This period may be set at a predetermined value which is selected to be as small as possible while ensuring that there will be an overlap period under worst case conditions and tolerance of the components.

According to another aspect of the present invention, there is provided a switch controller for starting an AC induction motor having a first set of windings and a second set of windings independently switchable from the first set, the switch controller comprising means for:

a. initially supplying current to the first set of windings without supplying current to the second set of windings, and b. subsequently supplying current to the second set of windings while continuing to supply current to the first set of windings;

characterized in that the means is further arranged, subsequent to step a, to cease to supply current to the first set of windings while continuing to supply current to the second set of windings.

BRIEF DESCRIPTION OF THE DRAWINGS

Specific embodiments of the present invention will now be described with reference to the accompanying drawings, in which:

FIG. 7 is a magnified part of the graph of current in FIG. 6 during switchover; and FIG. 8 is a comparative graph to FIG. 7 showing current in an alternative arrangement not in accordance with the invention.

DESCRIPTION OF PREFERRED EMBODIMENTS

Figure 1:
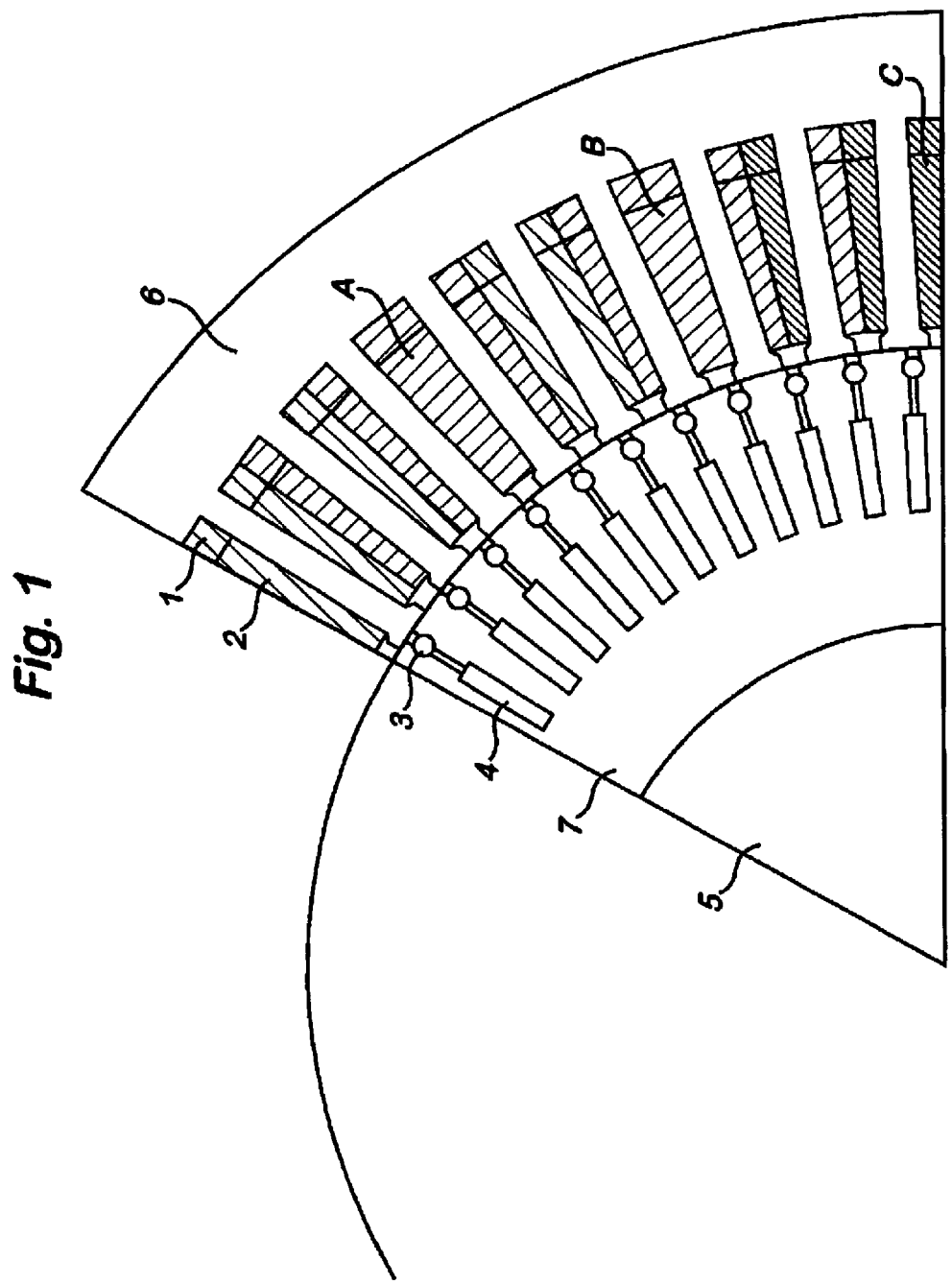
FIG. 1 is a cross-sectional diagram, perpendicular to the rotor axis, of a sector of the stator and rotor of an AC induction motor.

One specific embodiment of the present invention consists of a dual winding three-phase AC induction motor with associated switching circuitry. FIG. 1 shows a 60° sector of a cross-section of this motor perpendicular to the rotor axis. The motor has six-fold rotational symmetry about the rotor axis.

A stator consists of stator laminations 6 including stator slots through which the stator windings are wound. The stator windings consist of a set of start windings 1 located in a radially outer section of the slots, and a set of run windings 2 located in the remaining, radially inner section of the slots. Each set of windings comprises three windings connectable to respective voltage sources with different phase, as shown by the differently shaded sections A, B and C in FIG. 1. As can be seen from these sections, the phase connection of the start windings 1 is the same as that of the run windings 2 in each of the slots.

The start windings 1 are independently switchable from the run windings 2. The start windings 1 are of higher resistance and have a greater number of turns than the run windings 2.

The stator laminations are mounted within, and in good thermal contact with, a thermally conductive housing (not shown) preferably including cooling fins for increasing the surface area of the housing. The location of the start windings 1 in the radially outer section of the stator slot gives a high thermal conductivity with respect to the housing and therefore more effective heat dissipation. Hence, the risk of overheating when the start winding 1 is subject to inrush current is reduced.

A rotor comprises a rotor cage consisting of radially outer bars 3 and radially inner bars 4 located in rotor slots within rotor laminations 7, and a rotor shaft 5.

Figure 2:
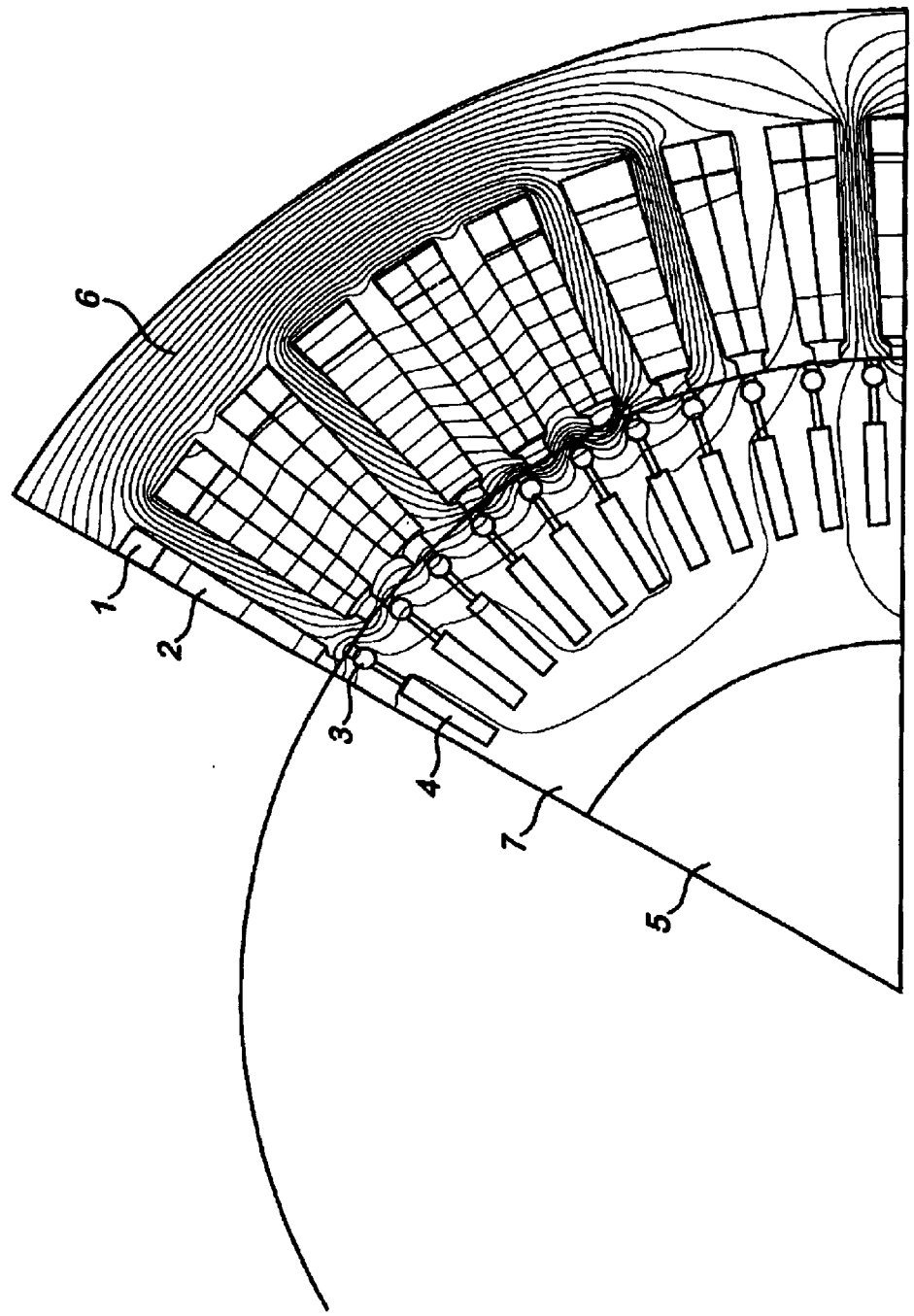
FIG. 2 is a flux plot diagram of the sector of FIG. 1.

FIG. 2 is a diagram of the same sector, showing lines of flux under start conditions. From this diagram, it can be seen that the flux linkage is at a maximum at the radially outer end of the stator slots so that the winding impedance of the start windings 1 is higher than it would otherwise be if the start windings were positioned in the middle or radially inner portions of the stator slots. The high impedance of the start windings 1 helps to reduce the inrush current.

Figure 3:
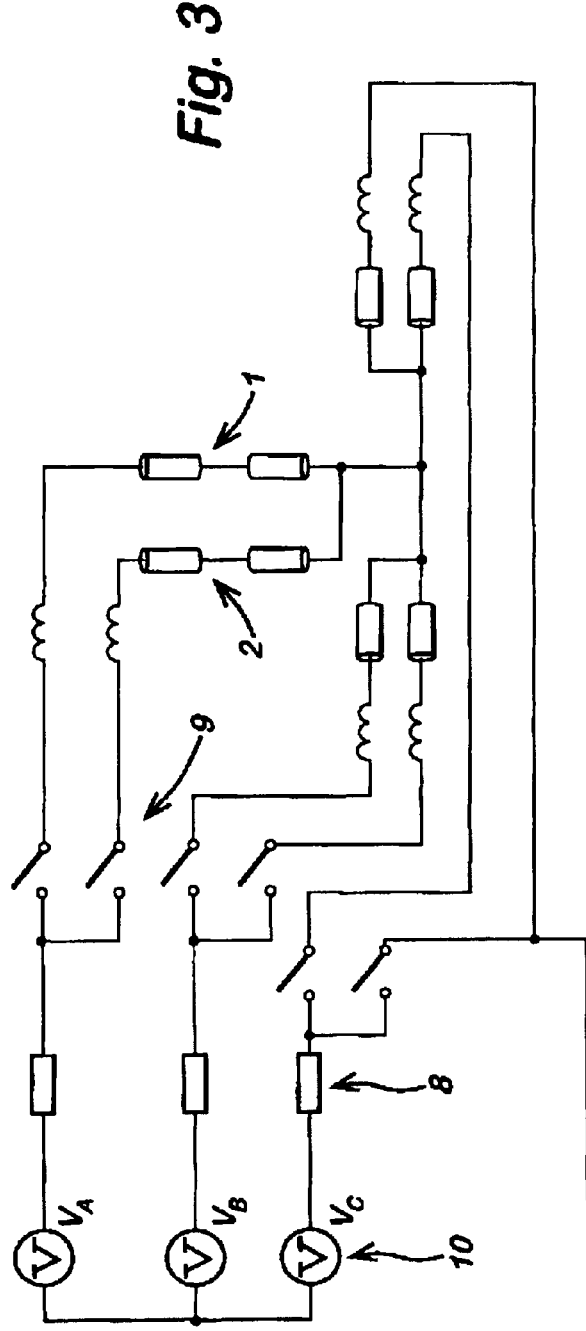
FIG. 3 is an equivalent circuit diagram of the AC induction motor connected to a switchable three-phase AC voltage source.
Figure 3:
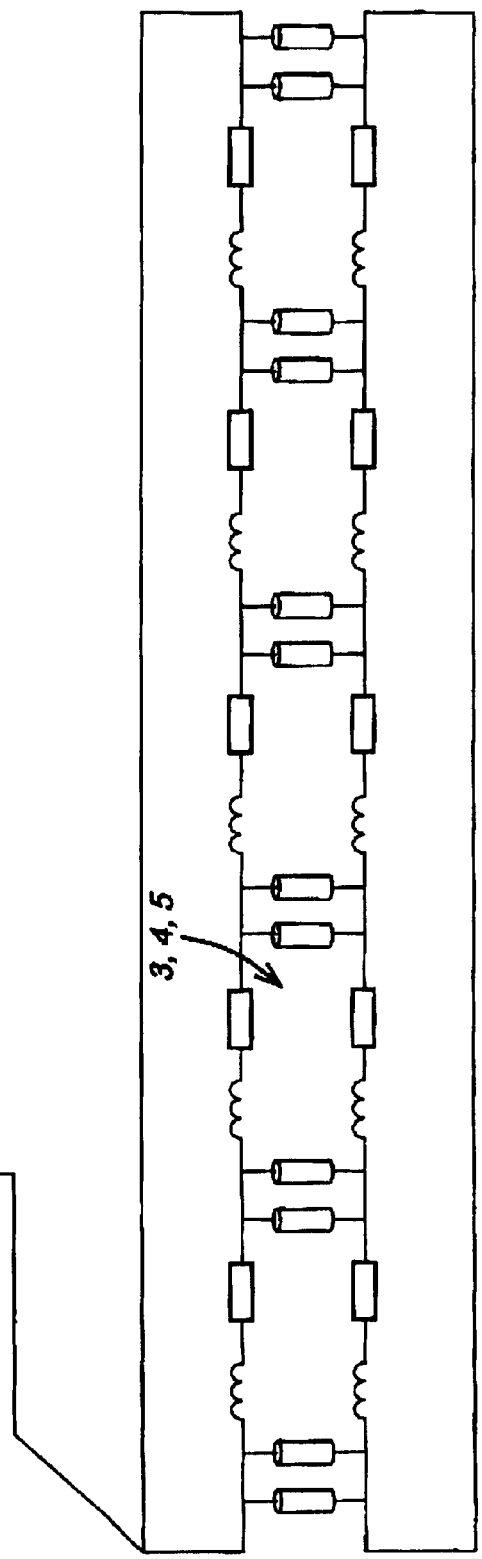

FIG. 3 shows an equivalent circuit of the motor connected to a switching device and a three-phase AC voltage source 10 providing AC voltages $V_A$, $V_B$, $V_C$ with a 120° mutual phase relationship. The AC voltage source includes feeder resistances 8 for each phase and switches 9 which are arranged independently to connect the set of start windings 1 and the set of run windings 2 to the AC voltage source. The equivalent circuit includes an electrical model of the rotor 3, 4, 5.

Figure 4:
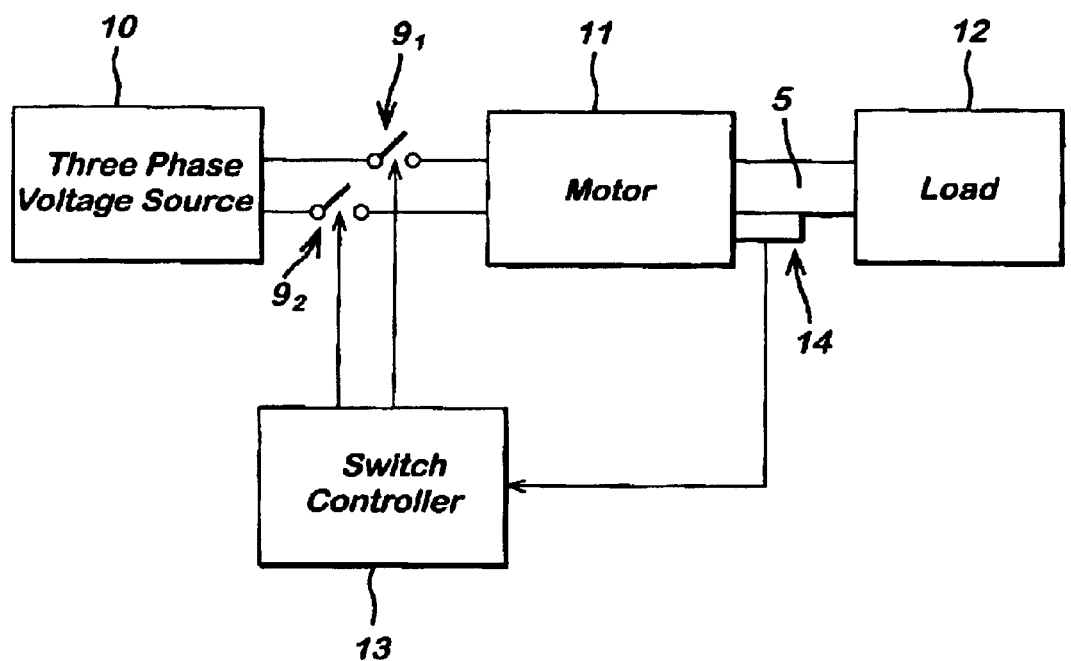
FIG. 4 is a schematic diagram of the motor connected to a switch controller and a load.

FIG. 4 is a schematic diagram of the motor 11 with its rotor shaft 5 connected to a load 12. Two three-phase contactors $9_1$, $9_2$ are arranged to connect the start windings 1 and run windings 2 respectively to the three-phase voltage source 10. A rotor speed sensor 14, such as a digital Hall effect sensor, is provided adjacent the shaft 5 and provides an input to a switch controller 13 which controls the switches 9. The switch controller 13 may be an electronic controller, or alternatively may be implemented as an electromechanical controller connected to an electromechanical speed sensor.

Figure 5:
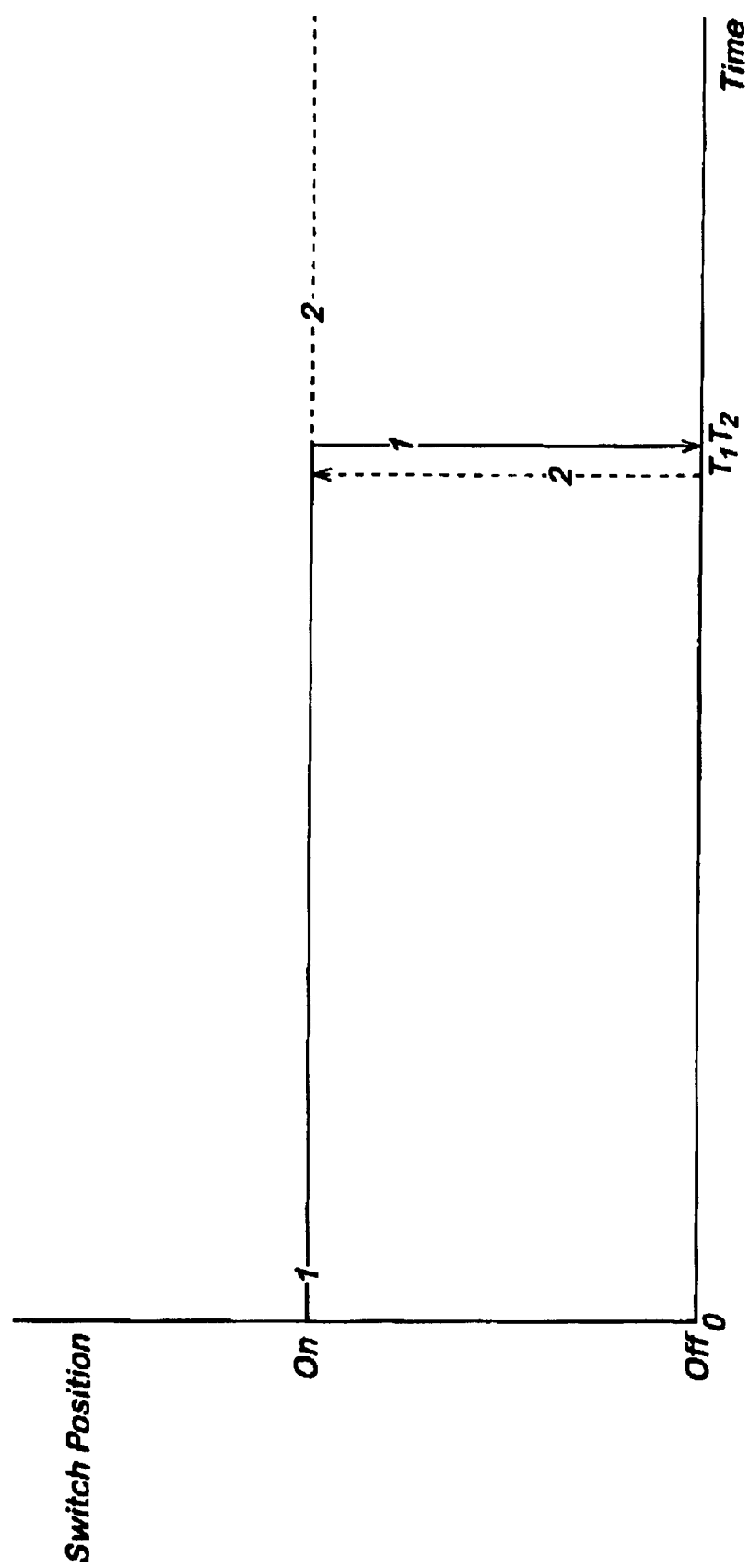
FIG. 5 is a timing diagram showing the switching of the motor during start-up.
Figure 6:
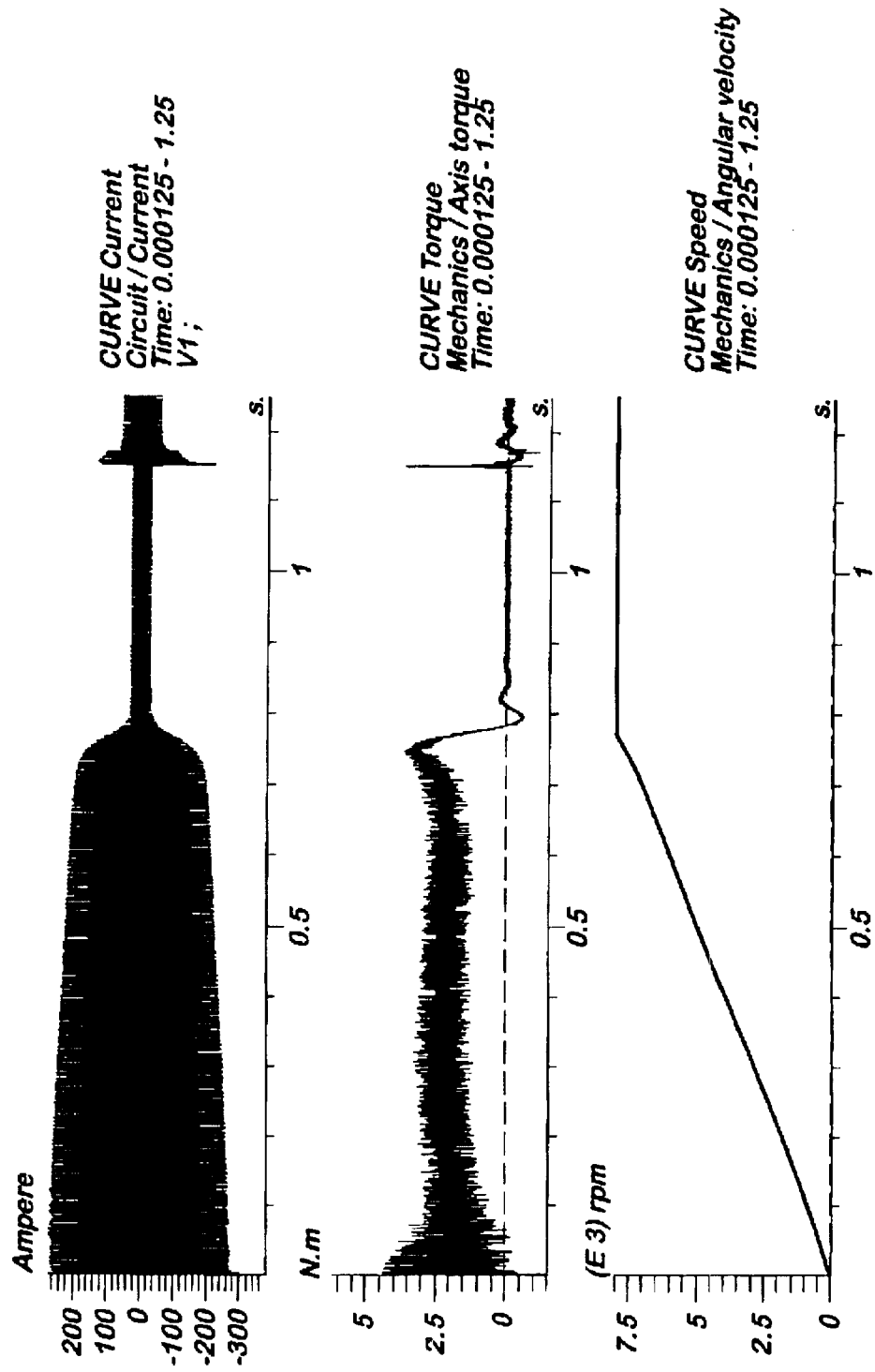
FIG. 6 is a graph of the current, torque and speed of the motor during start-up.

The operation of the switch controller 13 and motor 11 during start-up is illustrated in FIGS. 5, 6 and 7. To start the motor, the start winding contactor $9_1$, is switched on and power is supplied to the start windings 1. The inrush current starts at a high level (~200 A rms in this example) and falls slowly until the rotor speed approaches its maximum, when the current falls to a much lower constant level, at about 0.8 s from starting in this example.

When the switch controller 13 detects, by means of the speed sensor 14, that the rotor shaft 5 has reached a constant or predetermined speed, it closes the run winding contactor $9_2$, at a time $T_1$ which is about 1.15 s from starting in this example. Power is supplied to the run windings 2 in phase with the power which continues to be supplied to the start windings 1. A low current surge occurs, but at a much lower amplitude (~100 A rms in this example) than the inrush current. Shortly afterwards, at a time $T_2$ which is about 1.17 s from starting in this example, the start winding contactor $9_1$ is opened and power is no longer supplied to the start winding 1 while the motor 11 continues to run normally. The interval from time $T_1$ to time $T_2$ is predetermined by the switch controller 13 at a constant value which is as small as possible while being sufficient to ensure that power is supplied to the run windings 2 before the start windings 1 are switched off under worst-case conditions, and given the tolerances of the components.

FIG. 8 shows a comparative example where the start winding contactor $9_1$ is opened, after the motor 11 has reached its maximum speed, at a time $T_3$ before the run winding contactor $9_2$ is closed at a time $T_4$. A peak current of over 1000 A occurs, which is much greater than the inrush current peak.

In this specific embodiment, an inrush current level of less than 3 times rated current was achieved, in comparison with levels of 4 to 5 times rated current in conventional AC induction motors. The running efficiency of the motor was approximately 89% as a result of the design of the two separate start and run windings. Furthermore, the current surge during switchover was lower than the initial inrush current. The embodiment is therefore able to produce a higher power than prior art AC induction motors for a given AC power source.

The load 12 may be a variable load which is initially low on starting and increases as the motor accelerates or reaches its operating speed. For example, the load 12 may be a hydraulic pump with a start bypass valve. The start bypass valve automatically closes as the pump pressure reaches a predetermined level.

The motor 11 is particularly suitable for low inertia loads such as pumps, which can give rise to large fluctuations in motor speed during switchover.

The present invention is not limited to a three-phase induction motor, but may be applied to other polyphase or single phase induction motors.

Other embodiments and alternatives will be apparent to the skilled person and may fall within the spirit and scope of the present invention.

What is claimed is:

1. A stator for an AC induction motor, including a set of start windings and a set of run windings switchable from the set of start windings, wherein the set of start windings is radially offset from, and has the same phase arrangement as, the set of run windings, the set of start windings and the set of run windings pass through common radially extending slots in the stator, the start windings occupying a radially outer position in the common slots relative to the set of run windings.

2. A stator according to claim 1, wherein the set of start windings has the same number of poles as the set of run windings.

3. A stator according to claim 1 or claim 2, wherein the set of start windings is displaced radially outwardly from the set of run windings.

4. A stator according to claim 3, including stator laminations in thermal contact with a thermally conductive housing.

5. A stator according to claim 3, wherein a flux linkage of the set of start windings is greater than a flux linkage of the set of run windings.

6. A stator according to claim 1, wherein an impedance of the set of start windings is greater than an impedance of the set of run windings.

7. A stator according to claim 1, wherein the set of start windings comprises a greater number of turns than the set of run windings.

8. A stator according to claim 1, wherein the set of start windings and the set of run windings each comprise a plurality of windings of mutually different phase.

9. A stator according to claim 1, including switching means for supplying current to the set of start windings to start the motor and supplying current to the set of run windings after the motor is started.

10. A stator according to claim 9, wherein the switching means is responsive to a sensor for sensing the speed of the motor.

* * * * *